Aug. 31, 1965 C. S. COCKERELL 3,203,498
VEHICLES SUPPORTED ON A CUSHION OF AIR WITH RECOVERY
MEANS FOR ESCAPING CURTAIN FLUID
Filed Oct. 14, 1960 5 Sheets-Sheet 1

Inventor
C. S. COCKERELL
By Cameron, Kerkam & Sutton
Attorneys

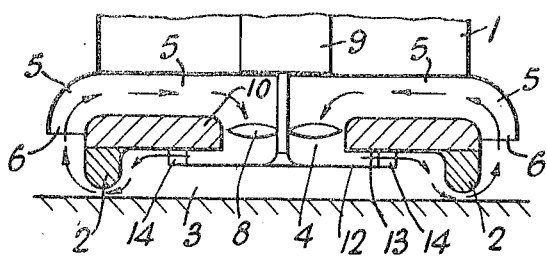
FIG. 4.
FIG. 5.
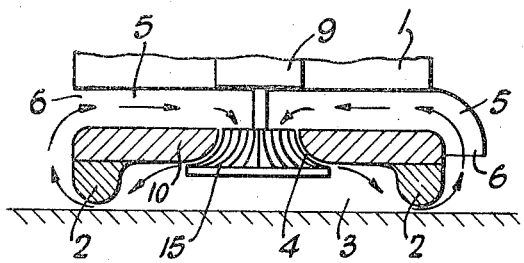
FIG. 6.
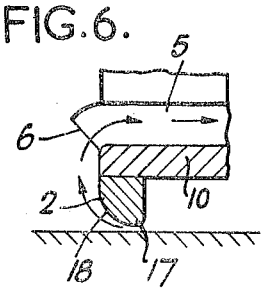
FIG. 7.
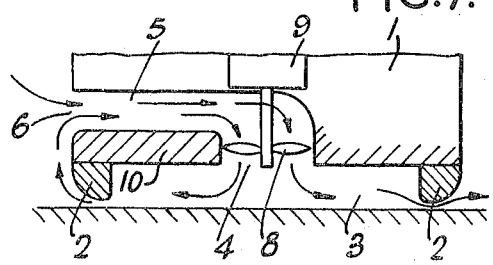
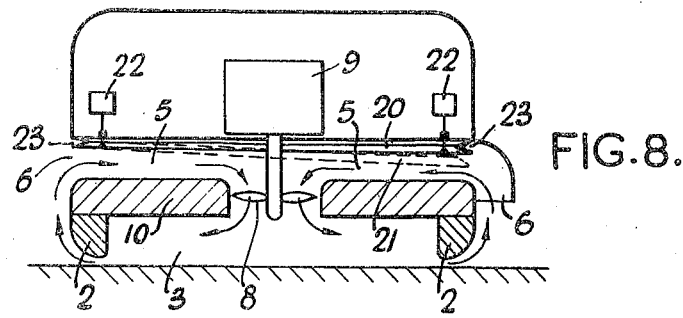
FIG. 8.

Aug. 31, 1965 C. S. COCKERELL 3,203,498
VEHICLES SUPPORTED ON A CUSHION OF AIR WITH RECOVERY
MEANS FOR ESCAPING CURTAIN FLUID
Filed Oct. 14, 1960 5 Sheets-Sheet 4

Inventor
C. S. COCKERELL
By Cameron, Kerkam & Sutton
Attorneys

United States Patent Office 3,203,498
Patented Aug. 31, 1965

3,203,498
VEHICLES SUPPORTED ON A CUSHION OF AIR WITH RECOVERY MEANS FOR ESCAPING CURTAIN FLUID
Christopher Sydney Cockerell, East Cowes, Isle of Wight, England, assignor to Hovercraft Development Limited, London, England, a British company
Filed Oct. 14, 1960, Ser. No. 62,649
Claims priority, application Great Britain, Oct. 16, 1959, 35,163/59
12 Claims. (Cl. 180—7)

This invention relates to vehicles travelling or hovering over land and/or water, and is applicable to vehicles which are supported above the surface over which they are to operate by one or more cushions of pressurised gas, usually air, the gas being expelled from a port or ports in the bottom surface of the vehicle and escaping to the atmosphere beneath the periphery of the vehicle.

The gas which escapes to the atmosphere still has considerable energy and there is thus a loss of power represented by this energy. If at least part of this escaping gas can be collected and returned to the means supplying the pressurised gas which forms the cushion, or cushions, an appreciable economy in power requirements can be obtained.

According to the invention there is provided a vehicle which, in operation, is supported above the surface over which it operates by at least one cushion of pressurised gas, having at least one projection depending below the bottom of the vehicle and bounding a space beneath the vehicle, means for supplying gas under pressure to at least one supply port situated on one side of the projection, at least one recovery port on the other side of the projection, and means for inducing a flow of gas through the recovery port, the gas flowing beneath the projection forming and containing with the projection the cushion of pressurised gas, at least part of the gas then flowing into the recovery port, the vertical cross-sectional profile of the projection for at least that part of its periphery associated with each recovery port being such that the gas flowing beneath the projection as that part of its periphery is constrained to follow the profile by the "Coanda" effect, the recovered gas recirculating through the means for supplying the gas under pressure.

In one particular embodiment of the invention, the gas issues from the supply port or ports directly into the said space, the gas then flowing beneath the projection and being recovered through a recovery port formed outside the projection. Thus according to a feature of the invention there is provided a vehicle which, in operation, is supported above the surface over which it operates by at least one cushion of pressurised gas, having at least one projection depending below the bottom of the vehicle and bounding a space beneath the vehicle, gas pressurising means for supplying gas under pressure to at least one supply port formed in the bottom of the vehicle and communicating directly with the said space, at least one duct terminating in a recovery port external of the projection and extending at least partly round the circumference of the projection, the duct communicating with the inlet of the gas pressurising means and inducing a flow of gas ino the recovery port, the vertical cross-sectional profile of the projection for at least that part of its circumference round which extends the duct being such that gas flowing beneath the projection is constrained to follow the said profile under the action of the suction at the recovery port and by the "Coanda" effect, at least part of the gas being recovered through the recovery port and flowing through the duct to the gas pressurising means.

In an alternative embodiment of the invention, the flow of the gas is from a supply port formed external of the projection, the gas flowing beneath the projection into the space. According to a further feature of the invention there is provided a vehicle which, in operation, is supported above the surface over which it operates, by at least one cushion of pressurised gas, having at least one projection depending below the bottom of the vehicle and bounding a space beneath the vehicle, gas pressurising means for supplying gas under pressure, the gas flowing through at least one duct extending round the circumference of the projection and terminating in at least one annular supply port, the vertical cross-sectional profile of the projection being such that the gas issuing from the supply port flows under the projection and is constrained to follow the profile by the "Coanda" effect, the gas finally flowing into at least one recovery port formed in the bottom of the vehicle within the projection and circulating to the gas pressurising means.

The invention will be more readily understood from the following description of various embodiments of the invention in conjunction with the accompanying drawings in which.

Figure 1:
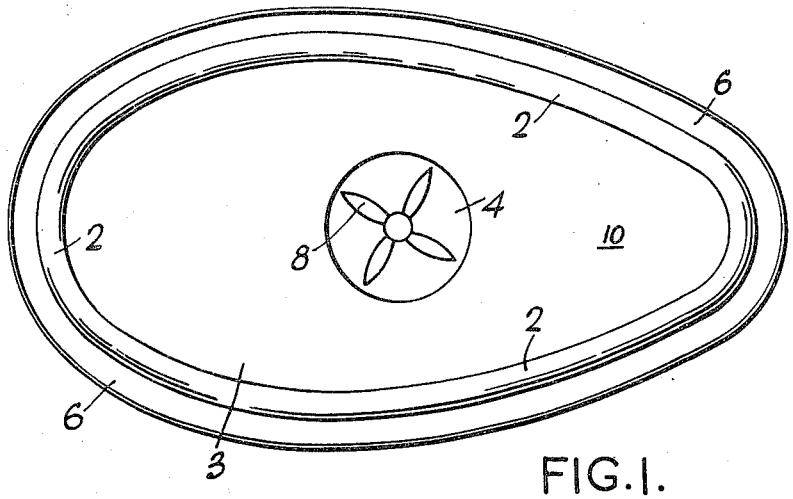
FIGURE 1 is an inverted plan view of a vehicle embodying the invention.
Figure 2:
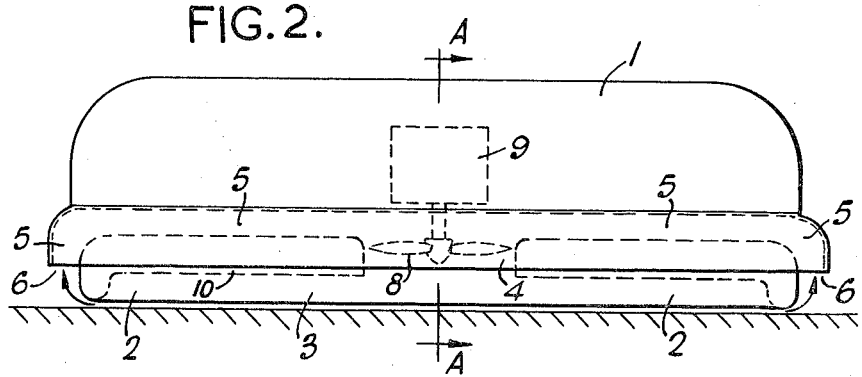
FIGURE 2 is a side view of the vehicle shown in FIGURE 1.
Figure 3:
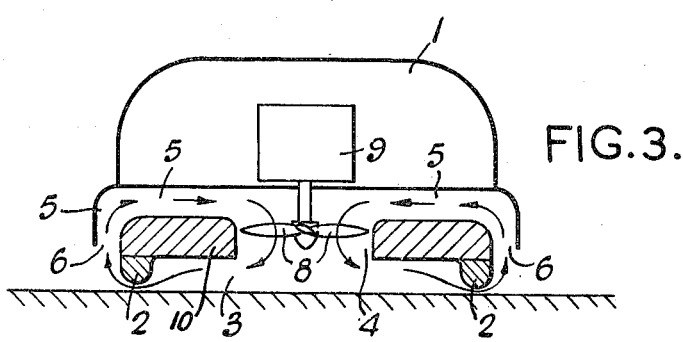
FIGURE 3 is a cross-section on the line A—A of FIGURE 2.
Figure 9:
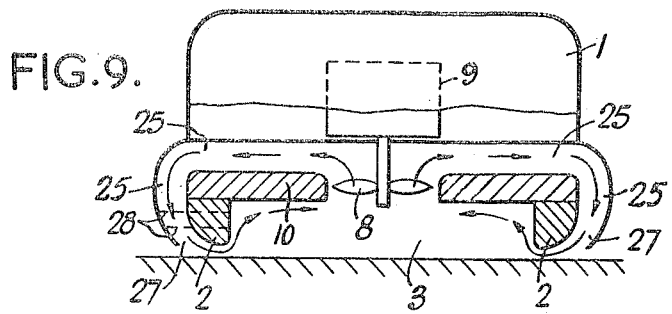
Figure 10:
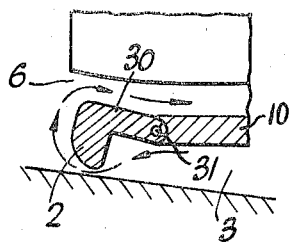
Figure 11:
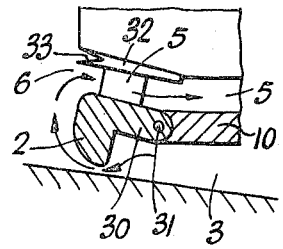
Figure 12:
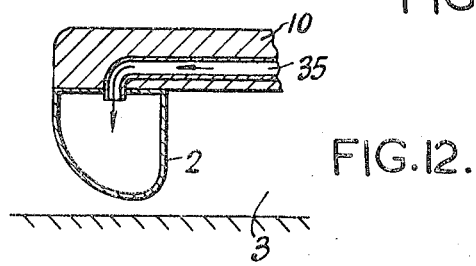
Figure 13:
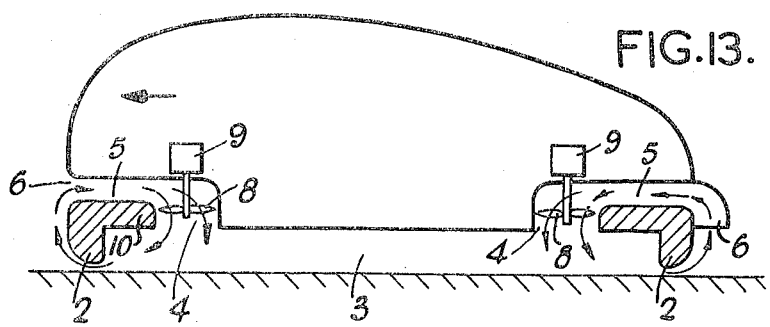
Figure 18:
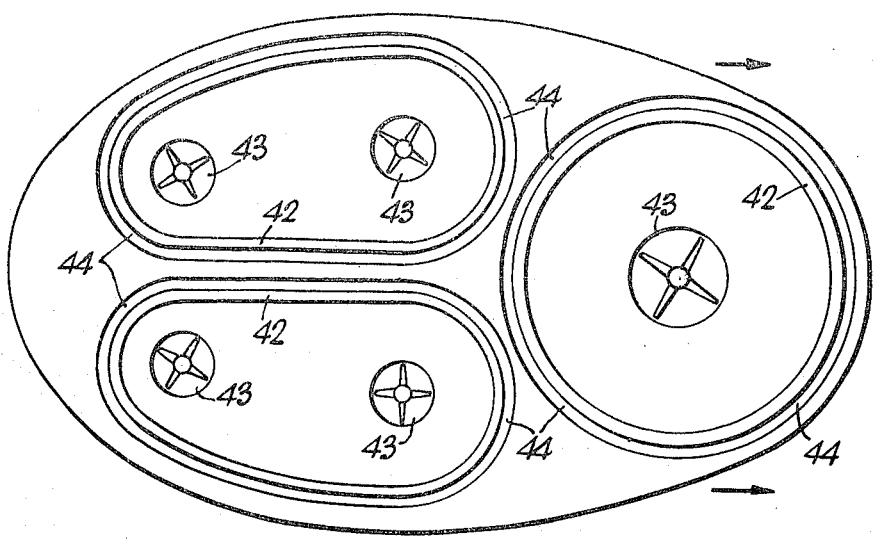
Figure 14:
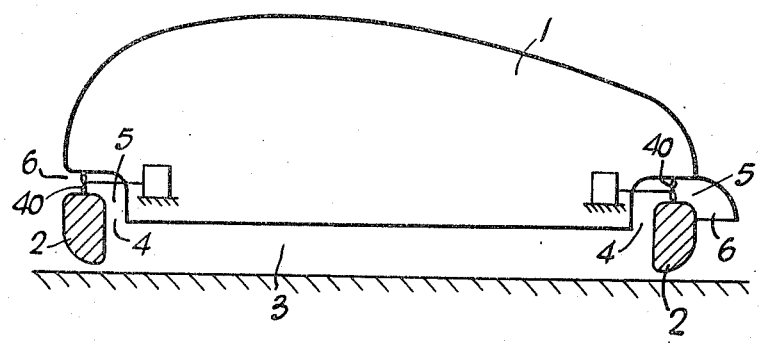
Figure 15:
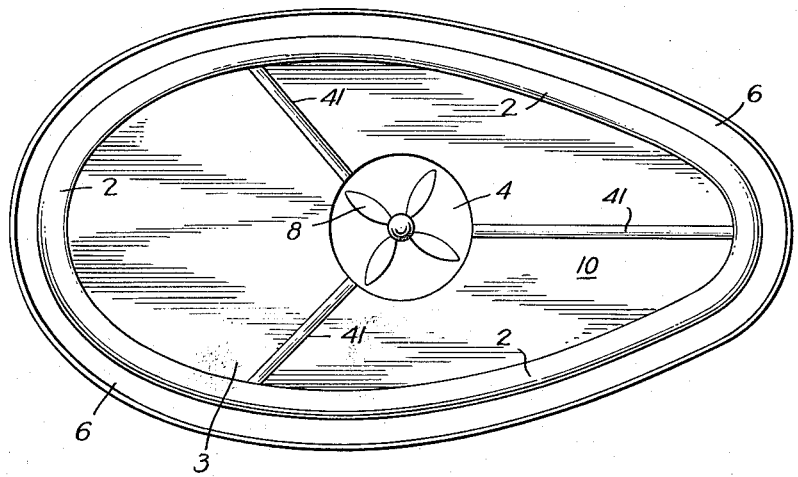
Figure 16:
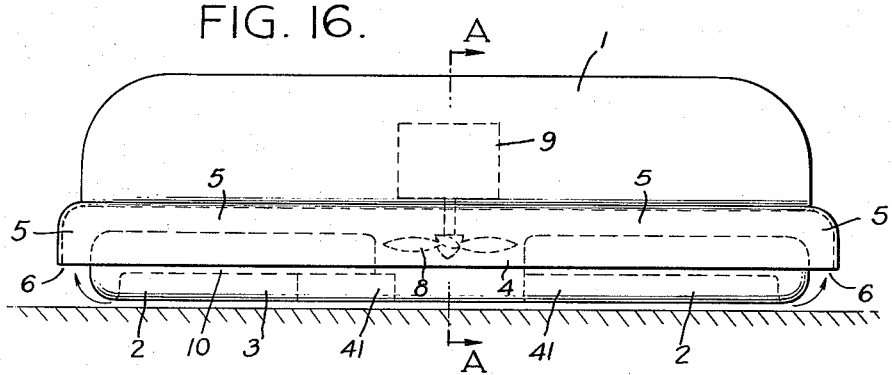
Figure 17:
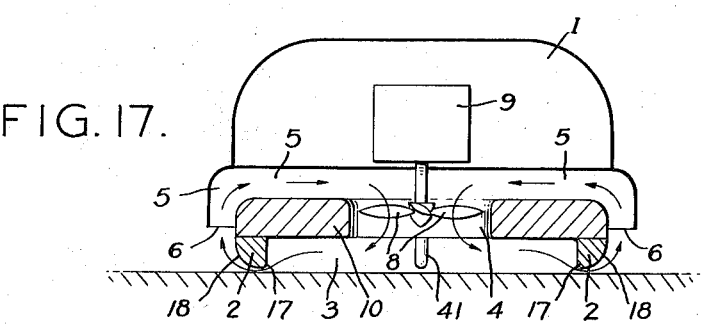

FIGURE 4 is a cross-section similar to that of FIGURE 3 illustrating a modification thereof, FIGURE 5 is a cross-section similar to that of FIGURE 3 illustrating a further modification thereof, FIGURE 6 is a fragmentary vertical cross-section of the bottom of a vehicle showing another modification, FIGURE 7 is a cross-section similar to that of FIGURE 3 illustrating a further embodiment of the invention, FIGURE 8 is a cross-section similar to that of FIGURE 3 illustrating another embodiment of the invention, FIGURE 9 is a cross-section similar to that of FIGURE 3 illustrating yet another form of vehicle embodying the invention, FIGURE 10 is a fragmentary vertical cross-section of the bottom of a vehicle illustrating a further embodiment of the invention, FIGURE 11 is a similar fragmentary cross-section to that of FIGURE 10, illustrating a modification thereof, FIGURE 12 is a fragmentary vertical cross-section through the bottom of a vehicle, illustrating a further embodiment of the invention, FIGURE 13 is a vertical cross-section through a vehicle illustrating yet another embodiment of the invention, FIGURE 14 is a vertical cross-section through a vehicle illustrating a further embodiment of the invention, FIGURES 15, 16 and 17 are views similar to FIGURES 1, 2 and 3, respectively, illustrating another modified form of vehicle embodying the invention, and FIGURE 18 is an inverted plan view of a further form of vehicle embodying the invention.

FIGURES 1, 2 and 3 illustrate a vehicle which is oval in plan form having a main body portion 1. Attached to the bottom 10 of the body of the vehicle, and depending from the periphery thereof, is a projection 2 enclosing a space 3 beneath the vehicle. Formed in the centre of the bottom of the vehicle is a supply port 4. A duct 5 extends round the periphery of the vehicle, the duct having a downward facing annular recovery port 6 situated a short distance above the level of the bottom of the projection 2. The duct 5 continues across the bottom of the vehicle and communicates with the supply port 4. Positioned in the supply port 4 is a propeller 8 driven by a motor 9. Initially, the vehicle rests upon the surface with the bottom of the projection 2 in contact with the surface. When the motor 9 is started, the propeller 8 draws in air through the recovery port 6 and the duct 5 and expels it into the space 3. A cushion of pressurised air is rapidly built up which lifts the vehicle clear of the surface, air escaping from the space 3, beneath the projection 2. The projection has a vertical cross-sectional profile of the "Coanda" type which, as shown best in FIGURE 3, is rounded at the bottom and has an outer surface which extends upwardly towards the inner edge of the recovery port 6, so that as the air flows out underneath the projection, it tends to follow the profile of the projection and flow upwards into the recovery port 6. This tendency to follow the profile of the projection, which is known as the "Coanda" effect, is enhanced by the action of the suction at the recovery port 6. Thus eventually a circulation of air is set up out of the supply port 4, under the projection 2, into the recovery port 6, through the duct 5 and back to the supply port 4. Once this circulation has commenced it will be seen that the only power required to maintain the flow of air is that required to overcome the pressure losses of the system and to make up any loss of air from the circulating system. A further consideration is that when the vehicle is moving there is a considerable reduction in momentum drag in recovering the air flowing under the projection in preference to taking in fresh air from the surrounding atmosphere as the recovered air has little or no horizontal component of motion relative to the vehicle whilst the surrounding atmosphere has a relative velocity which is a combination of the speed of the vehicle and any wind component which may be present.

FIGURES 1, 2 and 3 illustrate the basic arrangement of a vehicle embodying the invention, but a large number of variations and modifications can be made. Some of these are illustrated in FIGURES 4 to 13 of the drawings.

FIGURES 4 and 5 illustrate modifications of the vehicle shown in FIGURES 1, 2 and 3, in which the air is caused to flow from the supply port outwards towards the projection. In FIGURE 4, a member 12 is mounted below the supply port and deflects the air outwards along the under-surface 13, the air then flowing down the inner surface of the projection. This results in the air flowing under the projection 2 with an increased pressure head, providing improved stability characteristics in roll and pitch. The member may extend for a large portion of the distance across the bottom, as in FIGURE 4, or only for a short distance. Vanes 14 may be provided to support the member 12, and may also act as straightener vanes to straighten the flow of the air. In FIGURE 5 a centrifugal fan or compressor 15 replaces the propeller 8 of FIGURE 4. The air issues from the fan in an outward direction, flowing along the under-surface 13. FIGURE 5 also illustrates a further modification in which the recovery port 6 is forward facing. Recovery of air into the recovery port 6 is assisted, when the vehicle is moving forward, by the atmospheric air. The taking in of additional air required to make up for air lost from the circulation system is enhanced due to ram effect. In a vehicle as in FIGURE 1, the recovery port may be forward facing for a short distance either side of the longitudinal centre line, whilst the direction in which the remainder of the recovery port faces may vary from the horizontal to the vertical at the rear of the vehicle. Generally, however, the recovery port is forward facing at the front and downward facing for the remainder of the periphery.

The profile of the bottom of the projection may vary. In FIGURES 1 to 5 it is shown as being approximately semi-circular, while FIGURE 6 illustrates a modification in which the radius of the bottom of the projection is sharper on the inside corner 17 than on the outside corner 18. This latter profile provides improved flow characteristics beneath the projection 2, in that the flow adheres to the projection more readily.

FIGURE 7 illustrates a further embodiment of the invention in which air is recovered only round the front and sides of the vehicle, the air flowing beneath the projection 2 at the rear of the vehicle and escaping to the atmosphere. In this example, the recovery port 6 is forward facing at the front and downward facing along the sides of the vehicle. The duct 5 extends only between the front and sides of the vehicle and the supply port 4. Additional air to replace the lost air is taken in at the front of the vehicle through the recovery port 6.

The trim of the vehicle can be varied by varying the distribution of the air as it enters the recovery port. This can readily be done, for example, as shown in FIGURE 8. A flat plate 20 is situated in the duct 5 and can be tilted about the axis of the propeller and motor so as to vary the vertical widths of the duct around the periphery of the vehicle as shown by the dotted lines 21. The flat plate 20 is tilted by servo motors 22, and flexible sealing members 23 are provided between the edge of the flat plate 20 and the top surface of the duct 5. An alternative or additional means of varying the trim of the vehicle can be obtained when a deflecting member is mounted below the propeller, as in FIGURE 4. By mounting this member so that it can be tilted the distribution of the air flowing beneath the projection can be varied. Such flow variation can be in addition to the variation obtained by the tilting flat plate 20 in FIGURE 8.

Instead of the air flow being from the propeller into the space in which is formed the cushion of pressurised air, and then out beneath the projection, the air may flow in the reverse direction. Such an arrangement is shown in FIGURE 9. The air flows from the propeller 8 into a duct 25, which is similar to the duct 5 in the previous examples, and which extends downwards around the outside of the projection 2. An annular supply port 27 is formed at the bottom of the duct 25. The air issuing from the supply port flows inwards under the projection into the space 3 and thence into the intake of the propeller 8, which is in the same position as the supply port in the previous examples. Thus, generally, the supply and recovery ports have only reversed positions although the supply port 27 is closer to the surface than is the recovery port 6 in the previous examples. It is necessary to provide auxiliary intakes for the admission of air to the space 3 when starting operation of the vehicle and at any other time when the cushion pressure falls below a predetermined pressure. Conveniently these auxiliary intakes can be in the form of ducts passing through the projection 2 and duct 25, as shown dotted at 28. When the vehicle is operating over firm flat surfaces means must be provided for giving an initial clearance between the bottom of the projection and the surface.

To improve the operation of the vehicle over irregular surfaces, the projection may be arranged to deflect upwards. Typical examples are either by attaching the projection by hinges as shown in FIGURES 10 and 11 or by making the projection itself flexible as shown in FIGURE 12. In FIGURE 10, the projection 2 together with part of the bottom of the vehicle 30, is attached to the main portion of the body by pivots or hinges 31. As the vehicle passes over irregularities the projection 2 can move up and down. The projection and the accompanying portion 30, is preferably made in short separate lengths so that relative displacement of the projection can take place. Flexible seals be provided between adjacent lengths. The recovery port 6 and at least the outer portion of the duct 5 must be made large enough in the vertical direction to accommodate the movement of the projection. Alternatively, as shown in FIGURE 11, that part of the duct 5 which is associated with the moving projection 2 and accompanying portion 30 can be attached to the portion 30. In this case a clearance 32 is formed in the main body of the vehicle, a seal 33 being provided between the movable portion of the duct 5 and the main body. In FIGURE 12 the projection 2 is in the form of a flexible bag inflated by a fluid supplied through a pipe 35. The fluid can be for example air, exhaust gases or water. If air is used, air from the propeller 8 or from a separate source can be utilised. It is preferable for the inflation to be from a separate controllable source as the flexibility can then be controlled. Various other means of flexibly attaching the projection may be provided such as are described in co-pending application Serial No. 837,502, filed September 1, 1959. In order to ensure that the profile of the bottom of the projection remains unaltered, to prevent interference with the "Coanda" effect, the bottom of the projection is of rigid material. The projection may be attached to the main body of the vehicle in such a manner that it takes up a mean position when the vehicle is operating at its normal height, but is capable of deflecting upwards or downwards from the means position, wholly or locally, whenever the clearance between the bottom of the projection and the surface tends to decrease or increase. The projection may be loaded in any suitable manner.

In the examples so far described, the vehicle has been shown as having a single propeller 8, with a single supply port. It will be appreciated that in large vehicles, considerable ducting would be required for such an arrangement and that would be more convenient to provide several propellers and associated supply ports. FIGURE 13 is a vertical cross-section on the longitudinal axis of such a vehicle, showing two of the propellers 8 and motors 9, with the associated supply ports 4. The recovery port 6 and the duct 5 extend all around the vehicle, the duct 5 being divided into separate sections to feed the various propellers 8.

An alternative arrangement to reduce the length of the ducting is illustrated in FIGURE 14. In this arrangement the gas pressurising means, represented by the propellers 40, are situated at the periphery of the vehicle. The gas pressuring means may be a series of axial flow compressors, with their rotational axes horizontal and normal to the periphery of the vehicle or a series of centrifugal compressors. In the latter case, the axes of the centrifugal compressors can be parallel to the periphery of the vehicle. Other forms of pressurising means are those described in co-pending application Serial No. 100,420, filed April 3, 1961, corresponding to U.K. Patent Application No. 12,688/60. By arranging the compressors or pumps at the periphery of the vehicle, the supply ports 4 are situated adjacent to the projection 2 and the ducting between the recovery port 6 and supply port 4 is reduced.

The stability of the vehicle, in pitch and roll, can be improved by subdividing the cushion of pressurised air. For example, as illustrated in FIGURES 15, 16 and 17 which show a modified form of the vehicle of FIGURES 1, 2 and 3, the cushion can be subdivided by members 41 depending from the bottom of the vehicle. The members 41 normally project downwards to the same extent as the projections 2, and can be flexible or rigid or can be formed by curtains of air issuing from ports formed in the bottom of the vehicle. The modification of FIGURES 15 to 17 also differs from that of FIGURES 1 to 3 in that the profile of the bottom of projection 2 conforms to that illustrated in FIGURE 6 wherein the radius of the bottom of the projection is sharper on the inside corner 17 than on the outside corner 18.

A further method of improving the stability of the vehicle is to form separate cushions of pressurised air beneath the vehicle. This illustrated in FIGURE 18, which is an inverted plan view of a vehicle. Three projections 42 depend from the bottom of the vehicle, supply ports 43 being formed in the bottom of the vehicle within the projections. Recovery ports 44 are formed round the outside of the periphery of each projection 42.

In a vehicle as shown in FIGURE 18, variation in the attitude or trim of the vehicle in pitch and/or roll, results in a variation in the clearance between the bottoms of the projections 42 and the surface over which the vehicle is operating. A variation in the pressures of the cushions of pressurised gas results which has a stabilising effect.

I claim:
1. A vehicle which, in operation, is supported above the surface over which it operates by at least one cushion of pressurised gas, having a body, at least one projection depending below the plane of the bottom surface of the vehicle body and bounding a space beneath the vehicle, at least one supply port situated on one side of the projection, at least one recovery port situated on the other side of the projection, that port which is situated on the outside of the projection being positioned immediately adjacent to the latter so that the outer surface of the projection is at least in part substantially tangential to the flow of gas through said port, means for supplying gas under pressure to the supply port, and duct means communicating with said gas supplying means and said recovery port through which a flow of gas may be induced, the gas which issues from the supply port flowing beneath the projection and forming and containing with the projection the cushion of pressurised gas, at least part of the gas then flowing into the recovery port, the vertical cross-sectional profile of the projection for at least that part of its periphery associated with the port which is outside of and immediately adjacent the projection being rounded at the bottom and having an outer surface which extends upwardly towards said last named port, whereby the gas flowing beneath the projection at that part of its periphery is constrained to follow the profile by the "Coanda" effect, the recovered gas recirculating through the means for supplying gas under pressure to the supply port.

2. A vehicle as claimed in claim 1 in which the supply port is formed in the bottom of the vehicle within the projection and opens into the space bounded by the projection, the recovery port being formed outside and positioned above the bottom of the projection and extending at least part way round the horizontal periphery of the projection.

3. A vehicle as claimed in claim 2 in which at least part of the recovery port faces vertically downwards.

4. A vehicle as claimed in claim 3 in which that part of the recovery port which is at the front of the vehicle faces forward.

5. A vehicle as claimed in claim 1 in which the vertical cross-sectional profile of the projection has a smaller radius on its inner bottom corner than on its outer bottom corner.

6. A vehicle as claimed in claim 2 in which a member is provided beneath each supply port to deflect the gas towards the inner surface of the projection.

7. A vehicle as claimed in claim 1 in which means are provided for varying the width of the recovery port.

8. A vehicle as claimed claim 1 in which at least part of the projection is flexibly attached to the body of the vehicle so as to be capable of displacement relative thereto in a substantially vertical direction.

9. A vehicle as claimed in claim 1 in which the means for supplying gas under pressure comprises a multiplicity of gas supplying means.

10. A vehicle as claimed in claim 1 in which means are provided for subdividing said cushion of pressurised gas.

11. A vehicle which, in operation, is supported above the surface over which it operates by at least one cushion of pressurised gas, comprising a main body, a projection extending downwardly below the plane of the bottom surface of the vehicle body and bounding a gas-containing space beneath the vehicle, a supply port situated on one side of the projection, a recovery port situated on the other side of the projection, one of said ports being positioned outside of and closely adjacent to the projection and extending at least part way round the periphery thereof, and means for supplying gas under pressure to the supply port, the gas flowing from the supply port beneath the projection and forming and containing with said projection a cushion of pressurized gas, at least part of the flowing gas being induced into the recovery port, that port which is situated outside the projection being located immediately adjacent to the outer surface of the projection and above the level of the bottom thereof, the vertical cross-sectional profile of the projection being rounded at the bottom and having an upwardly extending outer surface which is directed towards said last named port, whereby the gas flowing beneath the projection follows the outer portion of said profile due to the "Coanda" effect.

12. A vehicle which, in operation, is supported above the surface over which it operates by a cushion of pressurised gas, comprising a main body, an annular projection extending downwardly below the plane of the bottom surface of the vehicle body adjacent the periphery thereof and enclosing a space beneath the vehicle wherein a cushion of pressurized gas may be formed, a supply port formed in the bottom of the vehicle body within the projection and opening into said space, an annular recovery port situated outside of and positioned above the bottom of the projection, means for supplying gas under pressure to the supply port, and duct means communicating with said gas supplying means and said recovery port through which a flow of gas may be induced, the gas flowing from the supply port beneath the projection and forming and containing with said projection the cushion of pressurised gas within said space, and at least part of said gas flowing into the recovery port, the vertical cross-sectional profile of the projection being rounded at the bottom and having an upwardly extending outer surface which is directed towards said recovery port, whereby the gas flowing beneath the projection is caused to flow upwardly along said outer surface into the recovery port by the "Coanda" effect.

References Cited by the Examiner
UNITED STATES PATENTS

| | | | |
|---|---|---|---|
| 2,743,787 | 5/56 | Seck | 180—7 X |
| 2,838,257 | 6/58 | Wibault. | |
| 3,050,146 | 8/62 | Crim | 180—7 |

OTHER REFERENCES

Publication: Symposium on Ground Effect Phenomena; Oct. 21–23, 1959; page 149.

A. HARRY LEVY, *Primary Examiner.*

PHILIP ARNOLD, *Examiner.*